United States Patent [19]

Boxall

[11] 4,039,948
[45] Aug. 2, 1977

[54] MULTI-CHANNEL DIFFERENTIAL PULSE CODE MODULATION SYSTEM

[76] Inventor: Frank S. Boxall, 380 Eleanor Drive, Woodside, Calif. 94062

[21] Appl. No.: 480,640

[22] Filed: June 19, 1974

[51] Int. Cl.² .......................................... H03K 13/22
[52] U.S. Cl. ............................ 325/38 B; 179/15 AP
[58] Field of Search ................. 179/15 AP; 325/38 B; 340/173 R, 173 RC, 347 AD

[56] References Cited

U.S. PATENT DOCUMENTS

| | | | |
|---|---|---|---|
| 3,296,612 | 1/1967 | Tomozawa | 340/347 AD |
| 3,354,267 | 11/1967 | Crater | 340/347 |
| 3,526,855 | 9/1970 | McDonald | 325/38 R |
| 3,657,653 | 4/1972 | Wilkinson | 325/38 B |
| 3,689,840 | 9/1972 | Brown et al. | 325/38 B |
| 3,707,680 | 12/1972 | Gabbard et al. | 325/38 B |
| 3,720,875 | 3/1973 | Franaszek et al. | 325/38 B |
| 3,723,909 | 3/1973 | Condon | 325/38 B |
| 3,763,433 | 10/1973 | Nicholas | 325/38 B |
| 3,772,458 | 11/1973 | May et al. | 325/38 B |
| 3,781,686 | 12/1973 | Ching | 325/38 B |
| 3,800,225 | 3/1974 | Meares | 325/38 B |
| 3,810,126 | 5/1974 | Butler et al. | 340/173 RC |
| 3,824,590 | 7/1974 | Limb | 325/38 B |
| 3,825,831 | 7/1974 | Ishiguro | 325/38 B |
| 3,843,940 | 10/1974 | Ishiguro et al. | 325/38 B |
| 3,868,574 | 2/1975 | Ferrieu et al. | 325/38 B |
| 3,877,023 | 4/1975 | Spicer et al. | 340/347 DA |
| 3,900,844 | 8/1975 | Wald | 340/347 C |

OTHER PUBLICATIONS

Cummiskey et al., "Adaptive Quantization in Differential PCM Coding of Speech," Bell System Technical Journal, vol. 52, No. 7, Sept. 1973, pp. 1105–1118.
O'Neal, "Delta Modulation Quantizing Noise ...," Bell System Technical Journal, Jan. 1966, pp. 117–141.
Sangster et al., "Bucket-Brigade Electronics . . . ," IEEE Journal of Solid State Circuits, vol. SC-4, No. 3, June 1969, pp. 131–136.

*Primary Examiner*—Thomas J. Sloyan

[57] ABSTRACT

A multi-channel differential pulse code modulation system providing communication between a plurality of analog signal sources and corresponding signal sinks employing time shared differential pulse code modulation encoders and decoders.

13 Claims, 6 Drawing Figures

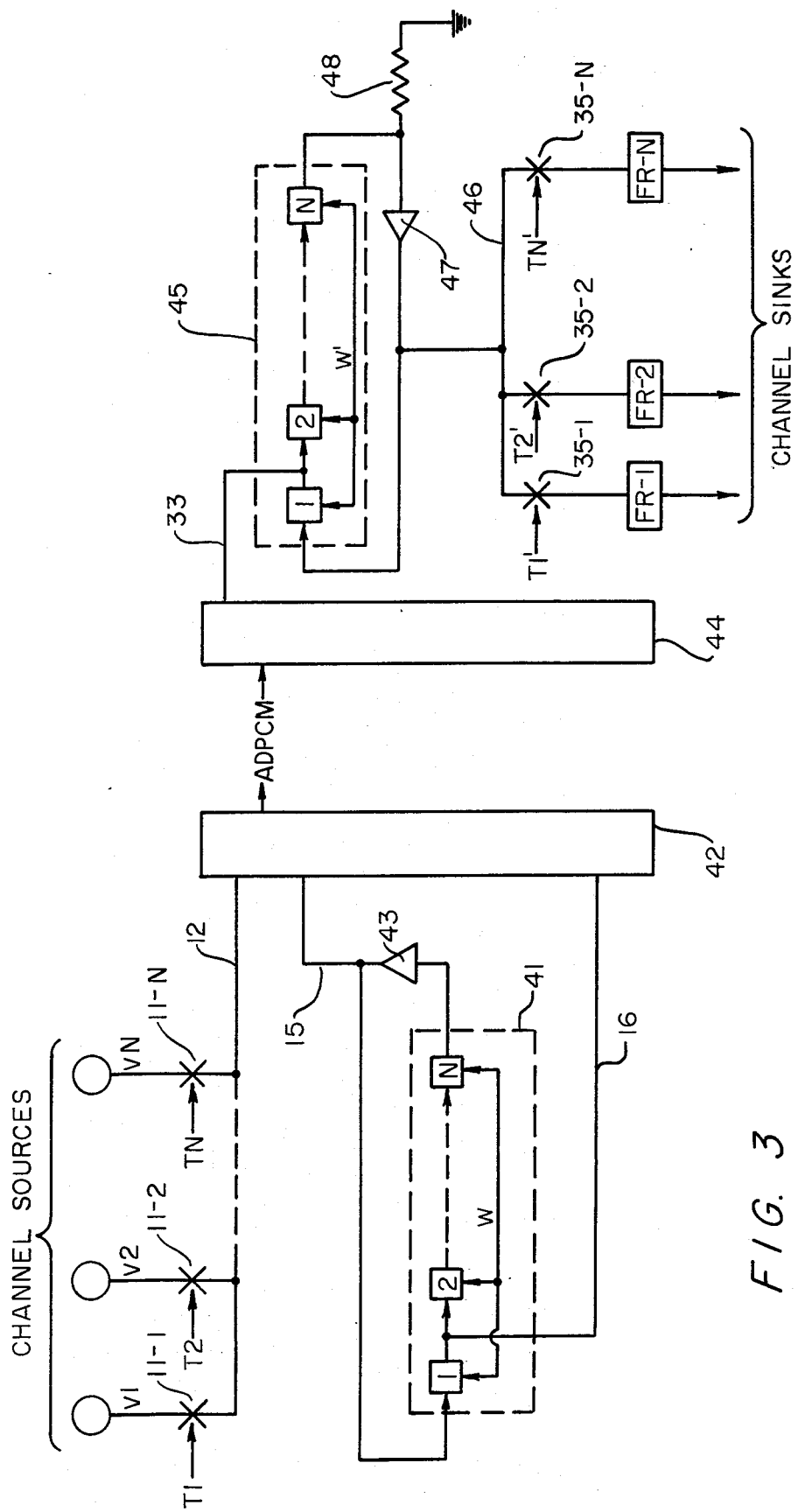

MULTI-CHANNEL DIFFERENTIAL PULSE CODE MODULATION SYSTEM

BACKGROUND OF THE INVENTION

This invention relates generally to a multi-channel communication system and more particularly to a multi-channel differential pulse code modulation system.

Telephone systems in the United States and Europe have adopted standards for voice transmission by pulse code modulation (PCM) techniques. In such systems, the source signal is periodically sampled to form a sequence of analog samples which are applied to an analog-to-digital converter. The converter generates a representative digital code word for each sample. The sequence of digital code words is applied to a digital transmission facility. At the receiving end of the transmission system, the digital code words are converted to a sequence of analog samples corresponding to the original analog samples by applying them to a digital-to-analog converter. Where there are a plurality of analog signal sources, they may be sequentially and periodically sampled to form a time division multiplex of analog samples which are applied to a single analog-to-digital converter to form a time division multiplex digital signal for transmission. At the receiving end, the time division multiplex digital signal is applied to a single digital-to-analog converter whose output is applied to an analog demultiplexer which serves to sequentially and periodically distribute the reconstructed analog signal samples to corresponding signal sinks.

Another method of converting an analog signal to digital form is by delta modulation. The analog source signal is periodically compared to an approximating signal representing the prior signal value stored in a local accumulator. The comparison generates logic 1 or logic 0 according to whether the source signal is greater or less than the accumulator signal. After each comparison, the accumulator signal is incremented by one step positively or negatively according to whether the comparison yielded logic 1 or logic 0, thereby providing an updated approximation signal for the next comparison. By this mechanism, the local accumulator signal is forced to be a stepped approximation to the source signal. The digital signal generated by the comparison is transmitted, and received by a receiving accumulator identical to the transmitter accumulator. Therefore, the output signal of the receiving accumulator is also a stepped approximation of the source signal and provides a reconstruction of the analog signal.

The delta modulation process generates one code bit for each comparison, whereas PCM generates one multibit code word for each sample. Therefore, at equal bit rates, the comparison rate for delta modulation is many times greater than the sampling rate for PCM.

A delta modulation process in which the accumulator step size is maintained constant is known as linear delta modulation. For many signals (e.g., telephone speech), the linear delta modulation process requires unreasonably high bit rates to avoid excessive slope overload distortion. This disadvantage has been overcome by the development of "adaptive delta modulation" in which the accumulator step size is dynamically adjusted in accordance with the slope of the source signal, or in accordance with this slope as inferred from observation of the digital signal generated by the comparator. Transmission quality of an adaptive delta modulation channel is comparable to that of a pulse code modulation system operating at the same bit rate. In general, multi-channel delta modulation communication systems employ an encoder and a decoder for each channel. The digital outputs of the encoders are multiplexed for transmission and demultiplexed upon reception and applied to individual decoders. In my copending application Ser. No. 444,822, filed Feb. 22, 1974, U.S. Pat. No. 3,949,298, there is described a multi-channel delta modulation system providing communication between a plurality of analog signal sources and corresponding signal sinks employing a time shared delta modulation encoder and decoder.

Still another method which has been suggested for converting an analog signal to digital form is differential pulse code modulation (DPCM). In DPCM the source signal is sampled at the same rate as in PCM, but the quantity which is encoded and transmitted digitally to the receiving terminal is the difference between the current analog input sample and the quantized approximation of the last sample. In DPCM, the coder generates a multibit code word for each difference, whereas delta modulation provides only one code bit for each difference signal. The DPCM coder may be a linear coder in which the coding step sizes are uniform or may be a non-linear coder in which the step size depends on the difference amplitude. In either case, the smallest step size should be small for good accuracy but the coding range of the coder should be large enough to accommodate the expected range of the difference signals. At the transmitter, the encoded quantized difference signal increments a local accumulator so that the accumulator output is the sum of all previous increments. The accumulator output is a close approximation to the analog input signal. At the receiver, a similar accumulator is incremented by the same encoded quantized difference signal and provides a representation of the analog signal.

A DPCM system in which the coder-decoder step size is invariant with time provides only a small improvement in channel quality compared to conventional PCM operating at the same bit rate. However, a DPCM system can be made "adaptive" by automatically adjusting the coder-decoder step size according to the results of previous encodings. Adaptive differential PCM (ADPCM) provides channel quality comparable to conventional PCM but at substantially lower bit rates. Quantative comparisons for single channel ADPCM have been reported by Cummiskey, Jayant, and Flanagan in a paper entitled "Adaptive Quantization in Differential PCM Coding of Speech," published in volume 52 of the Bell System Technical Journal (September 1973, pp. 1105-1118).

The coders and decoders used for DPCM and adaptive DPCM are relatively complex. Consequently, in the multi-channel systems presently under consideration where one coder and one decoder are employed for each analog signal, the systems become relatively expensive, and as a consequence DPCM and ADPCM have not been used in multi-channel communication systems.

OBJECTS AND SUMMARY OF THE INVENTION

It is an object of the present invention to provide an improved multi-channel time division multiplexed differential pulse code modulation system.

It is another object of the present invention to provide a multi-channel time division multiplexed differential pulse code modulation system in which the encoders and decoders are time shared by multiple analog signal sources and multiple analog signal sinks.

The foregoing and other objects are achieved by a multichannel DPCM system providing communication channels between a plurality of analog signal sources connected to a transmitting terminal and corresponding analog signal sinks connected to a receiving terminal which includes an analog multiplexer which sequentially samples the analog signals and applies the same to a time shared differential pulse code modulation encoder to provide time division multiplexed digital words to an associated transmission medium and a time shared differential pulse code modulation decoder and demultiplexer for receiving the time division multiplexed digital words, reconstructing the analog signals and distributing the reconstructed analog signals to associated signal sinks.

BRIEF DESCRIPTION OF THE DRAWINGS

FIG. 3 shows a multi-channel adaptive differential pulse code modulation transmitting system employing analog shift registers.

FIG. 4 shows a multi-channel adaptive differential pulse code modulation receiving system employing analog shift registers.

DESCRIPTION OF PREFERRED EMBODIMENTS

Figure 1:
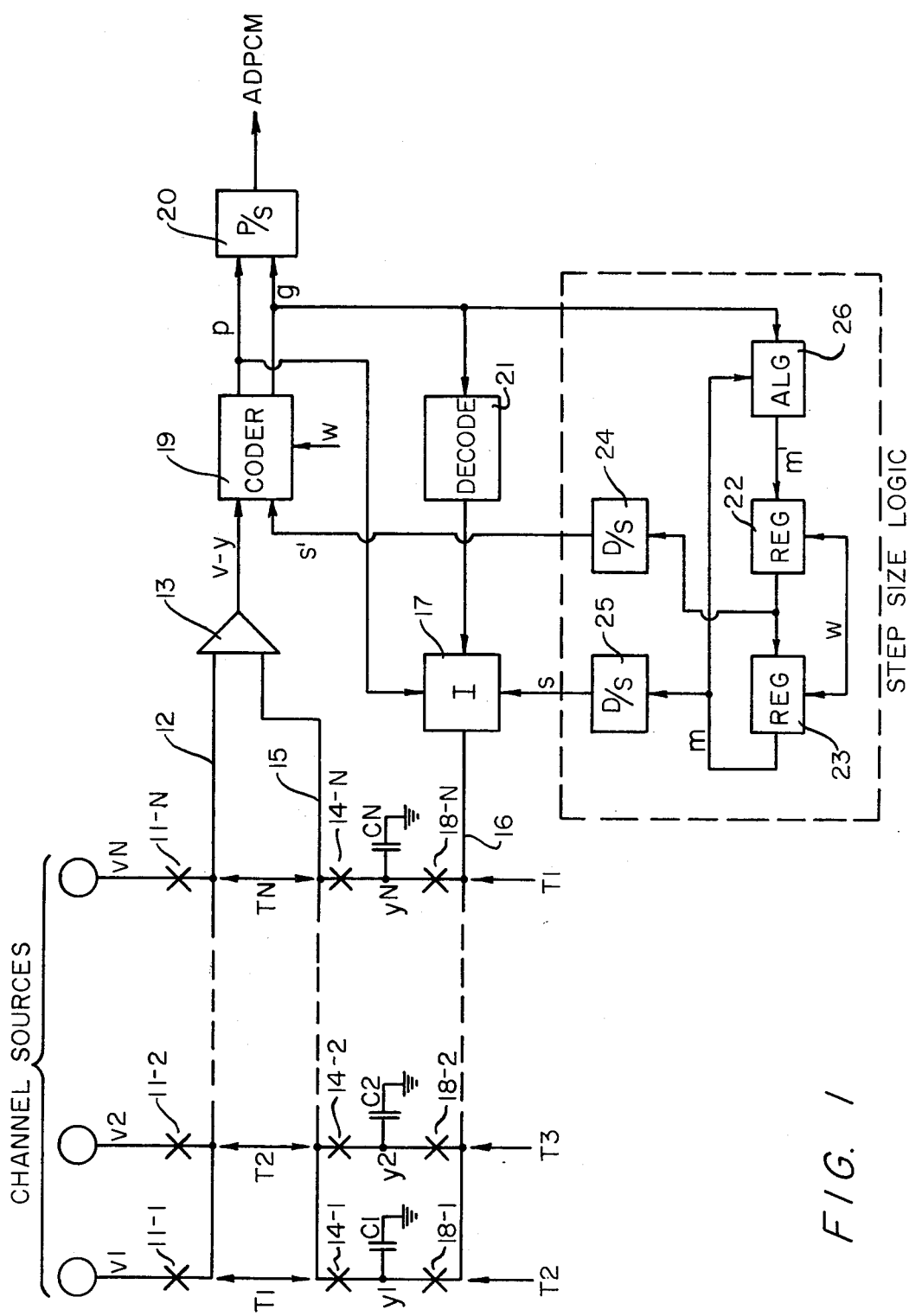
FIG. 1 is a schematic diagram showing a multi-channel adaptive differential pulse code modulation transmitting system employing time division multiplexing for converting analog signals to multiplexed digital words.

Referring particularly to FIG. 1, there is shown a differential pulse code modulation transmission system employing time division multiplexing. A plurality of analog signal sources with output signals v1 through vN are connected via corresponding transmission gates 11-1 through 11-N to line 12 which is one of the inputs to differential amplifier 13. Corresponding accumulators, in this example capacitors C1 through CN, are connected via corresponding transmission gates 14-1 through 14-N to line 15 which is the other input to differential amplifier 13. The accumulator signals are represented by y1 through yN. The accumulator signals are incremented by injection of current via line 16 from current source 17 which connects to the accumulators via corresponding transmission gates 18-1 through 18-N.

The transmission gates are operated by channel timing pulses T1 through TN provided by a terminal time base. Channel pulses occur in sequential order such that, for example, during channel pulse T2 transmission gates 11-2, 14-2, and 18-1 are conducting, all others non-conducting. During this interval, source and accumulator signals v2 and y2 are connected to differential amplifier 13, and current source 17 is connected to accumulator C1. This is the coding interval for channel 2 and the incrementing interval for channel 1. Similarly, channel pulse T3 is the coding interval for channel 3 and the incrementing interval for channel 2, and so on.

The output of differential amplifier 13 is the difference signal $v-y$, and is applied to coder 19. The coder output is a multibit digital code word representing the difference $v-y$. In FIG. 1 the coder output is shown as a polarity bit p and a magnitude code g, all in bit-parallel format. The magnitude code g is a binary coding of the number of code steps representing $v-y$. The size of the coding steps is determined by bias signal $s'$ from the step size logic, which is a second input to coder 19. Thus, the magnitude code g represents the quantized magnitude of $v-y$ measured in code steps of size $s'$. A suitable coder which provides parallel output format and with coding step size determined by a bias input is a "Tandem Stage Gray Coder" described on pages 591 and 592 and FIG. 25-22, page 593, of the Fourth Edition of Transmission Systems for Communications, Bell Telephone Laboratories, Inc. Logic conversion from Gray code output to sign-magnitude format is included within coder 19 of FIG. 1. The encoding of $v-y$ is registered at the coder output by word clock w which coincides with the trailing edges of the channel timing pulses. Thus, for channel 2, the coded value $p_2$, $g_2$ of $v_2-y_2$ is registered at the end of channel pulse T2 and rests at the coder output through channel pulse T3, and so on. The coded values p, g are converted to serial format for serial transmission in parallel-to-serial converter 20.

In FIG. 1 the polarity bit p is applied to current source 17 and determines the polarity of the output current. The magnitude of the output current is determined jointly by the number of steps represented by magnitude code g, decoded in logic decoder 21, and bias signal s from the step size logic. The output current of 17 increments the appropriate accumulator signal via the corresponding transmission gate. The magnitude of the increment is gs, i.e., g steps of size s. During channel pulse T3, the coder input is $v_3-y_3$, the coder output is $p_2$, $g_2$ and incrementing current determined by $p_2$, $g_2$ is applied to C2 via transmission gate 18-2 to increment $y_2$. Also, during T3 the coding step size for channel 3 is determined by $s_3'$ from the step size logic, and the incrementing step size is determined by $s_2$ from the step size logic. It will become apparent that the step size $s_2$ used for incrementing $y_2$ is the same step size $s_2'$ which was used for the coding of $v_2-y_2$ in the preceding channel time slot.

The step size control used for this ADPCM system is one in which, for each channel, the step size for the next encoding is determined by the step size of the last encoding and the number of steps last encoded. Such step size control is described in the previously cited paper by Cummiskey et al. There are M+1 discrete step sizes. The smallest step size is normalized to unity, and m serves as an index which defines a corresponding step size:

$$s = r^m$$

where r is a constant ($r > 1$) and integer exponent m ranges from 0 to M. Thus, the largest step is $r^M$ times the smallest.

For each channel, let m designate the step size used in the last encoding, let g be the number of steps encoded with m, and let m' designate the step size to be used in the next encoding. Then the adaptation logic determines m' in terms of m and g. To be specific, assume 4-bit ADPCM in which g (3-bits) represents 0 to 7 steps, and the algorithm is $$m' = m + g - 3$$

Thus, if $g = 7$, the next step size will be $r^4$ times the last, or if $g = 0$, the next step size will be $1/r^3$ times the last, and so on.

In FIG. 1 the step size index m for each of the N channels is stored in binary coded form and parallel format in the N stages of a multibit shift register consisting of parallel single-bit registers, one register for each bit required to represent m. Multibit register 22 has N-1 stages, and multibit register 23 has one stage. These are clocked by word clock w, such that the m-words for the N channels appear sequentially at the output of register 22 synchronously with the coding intervals of corresponding channels. Thus, during channel pulse T3, word $m_3$ rests at the output of register 22 and $m_2$ rests at the output of register 23. Word $m_3$ is the step size index for channel 3. It is applied to decoder-and-switch logic 24 where it is decoded and operates one of M + 1 switches which select step size bias $s' = r^{m_3}$ to coder 19 for coding channel 3. Word $m_2$ is the step size index for channel 2. It is applied to decoder-and-switch logic 25 where it is decoded and operates one of M + 1 switches which select step size bias $s = r^{m_2}$ to current source 17 for incrementing channel 2.

Word $m_2$ is also applied as one input to algorithm logic 26. The other input to 26 is $g_2$, the magnitude code for channel 2, which rests at the coder output during channel pulse T3. The output of algorithm logic 26 is $m_2' = m_2 + g_2 - 3$ which is the new step size index to be used in the next encoding of channel 2. At the end of channel pulse T3, $m_3$ advances to the output of register 23 to determine the incrementing step size for channel 3 and $m_2'$ enters register 22. Word $m_2'$ shifts forward with each channel pulse and appears at the output of register 22 with the occurrence of channel pulse T2 of the next frame (coding interval for channel 2) and at the output of register 23 with the occurrence of channel pulse T3 of the next frame (incrementing interval for channel 2). Thus, the m-words for the N channels circulate through registers 22 and 23 and appear at the register outputs synchronously with the coding and incrementing intervals of corresponding channels, and are updated in algorithm logic 26 synchronously with the appearance of corresponding magnitude codes g at the coder output. Because the step size index m is limited to the range 0 to M, the algorithm logic contains "end stops" such that m cannot be incremented below 0 or above M.

Figure 2:
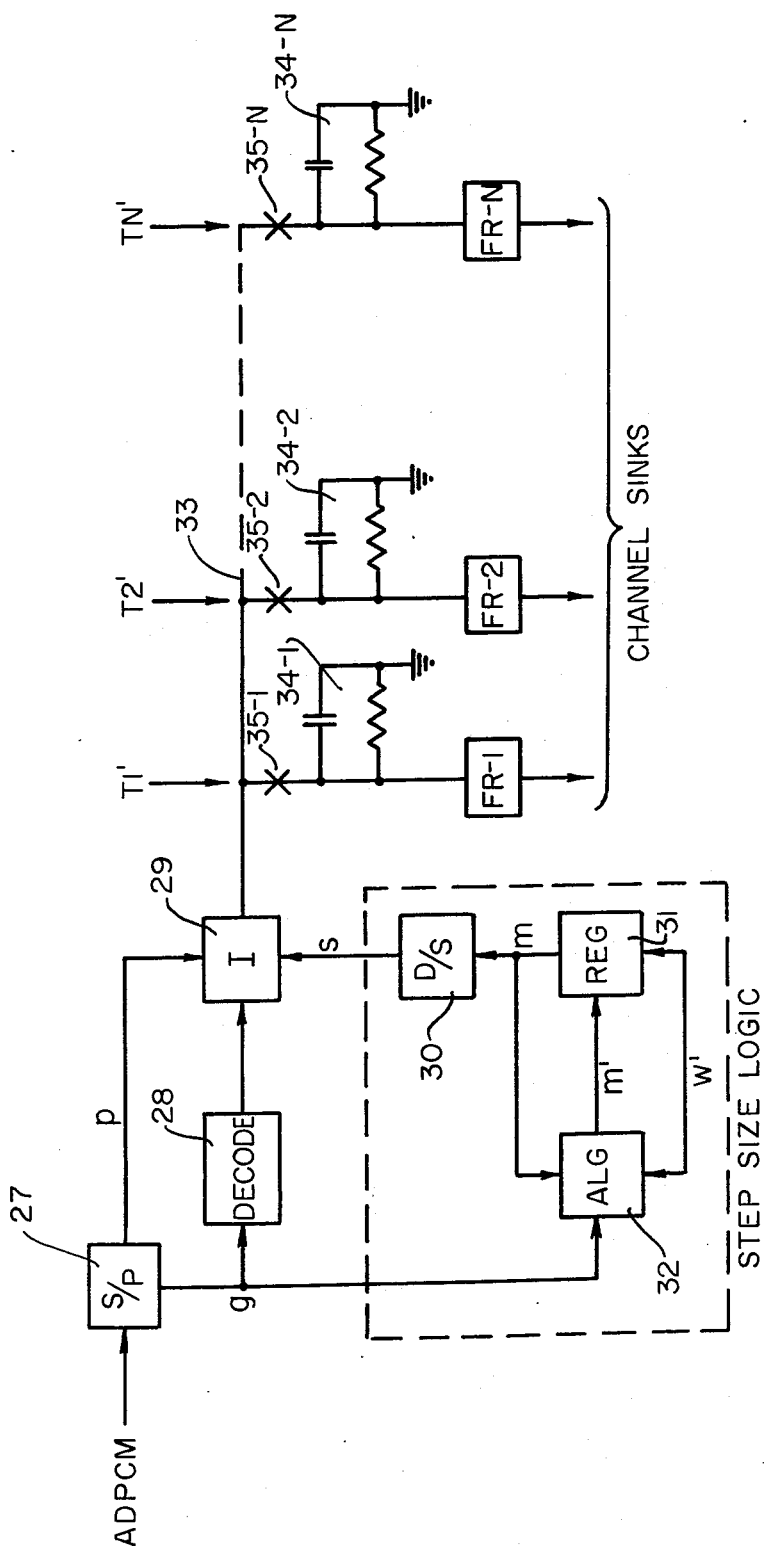
FIG. 2 is a schematic diagram showing a multi-channel adaptive differential pulse code modulation receiving system for receiving digital multiplexed words transmitted by the transmitting system of FIG. 1 and converting them to analog signals.

In FIG. 2 the receiving terminal includes serial-to-parallel converter 27 which converts incoming code words in serial format to parallel sign-magnitude format. p is the polarity bit and g is the magnitude code. Elements 28, 29, 30 and 32 of FIG. 2 are identical respectively to elements 21, 17, 25 and 26 of FIG. 1. Element 31 of FIG. 2 is an N-stage multibit shift register which is equivalent to the combination of registers 22 and 23 in FIG. 1.

Each incoming code word determines an incrementing current from current source 29. The sign of the current is determined by polarity bit p, the magnitude of the current is determined jointly by the number of steps represented by the magnitude code g, decoded in logic decoder 28, and bias signal s from the step size logic. The step size is determined by index word m (in binary code) at the output of register 31. Word m is applied to decoder-and-switch logic 30 where it is decoded to operate one of M + 1 switches which select step size bias $s = r^m$ to current source 29 for incrementing the corresponding channel accumulator. The increment magnitude is gs, i.e., g steps of size s.

The m-words for each of the N channels are stored in register 31 clocked by receiving terminal word clock w' and appear sequentially at the output of register 31 synchronously with the registration of the corresponding channel code words in parallel format at the output of serial-to-parallel converter 27. The channel magnitude code g and corresponding step size index m are the two inputs to algorithm logic 32. Its output is the new index $m' = m + g - 3$. Word m' enters register 31, and appears at the output of register 31 one frame later for use in the next incrementing of that channel.

The output of current source 29 is applied to line 33 and increments channel accumulators 34-1 through 34-N via corresponding transmission gates 35-1 through 35-N. The transmission gates are operated by sequentially occurring channel timing pulses T1' through TN' provided by the receiving terminal time base. Channel timing pulses occur synchronously with the appearance of corresponding incoming channel code words at the output of serial-to-parallel converter 27, whereby each incoming code word increments the corresponding channel accumulator. The channel accumulator outputs connect to channel filters FR-1 through FR-N and thence to the signal sinks of corresponding channels.

The receiving accumulators have a resistor connected across a condenser. Without the resistor, any difference between the magnitude of positive and negative currents from the current source 29 would cause the condenser to gradually accumulate excess charge of one sign ultimately moving the accumulator beyond the limits of its working range. The resistor provides a discharge path which automatically drains off charge in proportion to the d.c. voltage of the condenser thereby holding the analog approximating signals within limits. The combination of condenser and resistor is generally referred to as a "leaky integrator." The encoder-accumulator may also be made "leaky" in order to maintain similar characteristics. However, the leaky integrator is not a necessity at the encoder because the encoding process makes the analog approximation y follow v regardless of whether the current source is perfectly balanced or not.

Each terminal is provided with a time base which generates the timing pulses T1 through TN through T1' through TN' and word clocks w and w' required for operation of the various system elements. The transmitting terminal output bit stream is organized in repetitive frames with each frame containing a plurality of channel time slots with a polarity bit and a magnitude code word in each channel time slot. The receiving time base is synchronized to the transmitting time base by providing a framing code, in a framing time slot, which can be uniquely identified at the receiving terminal. Framing, timing and the like in multi-channel time division multiplex systems are well known and are not referred to in the following description. It is understood that an actual system would contain time slots in the frame for these purposes.

The means described above for adapting the coder-decoder step size leads to a potential problem. At the receiving terminal the new step size index m' for each channel depends on the received magnitude code g. Because of digital transmission errors, the magnitude code g may differ from that transmitted. Then, the receiving terminal will generate a new index m' different from that at the transmitting terminal. After such an event, the two ends are operating with different step sizes and the net gain of the channel is altered accordingly. However, this problem is automatically corrected for many classes of information signal. If the information signals contain frequent intervals of zero signal, then the encoder moves to the minimum step size in those intervals and transmits minimum magnitudes to the decoder. This causes the receiving terminal decoder to move to minimum step size. Thus, the two ends will reestablish identical step sizes automatically during these zero-signal intervals. Such would be the case for a channel transmitting speech signals. On the other hand, other information signals may not contain sufficient zero-signal intervals to guarantee resynchronization. In such cases it is desirable to include provisions for periodically updating the decoder step size to agree with the current encoder step size.

One method of solving this step size tracking problem is to add an update channel to each multi-channel transmission frame. In the case of sixteen step sizes, the update channel would require four bits. Frames are numbered 1 through N, where N is the number of channels. In frame 1, the update word is assigned to channel 1; in frame 2 to channel 2, and so on, and each update word carries the current step size of the assigned channel. At the receiver, the incoming update words are used to set the current step size in the assigned channel. As each channel is updated once every N frames, a transmission error in the update channel will set the wrong step size in the decoder but this will be corrected N frames later. This update strategy consumes four bits per frame to update each of N channels once every N frames.

Rather than employing separate accumulators and associated transmission gates for each channel as in FIGS. 1 and 2, an analog shift register having one stage for each channel may be used. Such a system is shown in FIGS. 3 and 4 where like reference numerals have been used for like parts of FIGS. 1 and 2. In FIG. 3 the analog source signals v1 through vN are sampled by transmission gates 11-1 through 11-N operated sequentially by channel timing pulses T1 through TN to provide a time division multiplex of analog samples to line 12. The corresponding channel approximating signals y1 through yN are stored and circulated within N-stage analog shift register 41. The analog shift register is clocked by word clock $w$ such that the approximating signals y1 through yN appear sequentially on line 15, synchronously with the sampling of corresponding analog sources. After its coding interval, each channel approximating signal re-enters the first stage of the analog shift register and is incremented by current injected via line 16. Line 16 is connected to the output of the first stage of the analog shift register because the incrementing interval for each sample is the interval following the coding interval. The block 42 of FIG. 3 includes elements 13, 17 and 19 through 26 of FIG. 1, and these operate as already described. The analog shift register 41 of FIG. 3 may be of the type described by Sangster and Teer, IEEE Journal of Solid State Circuits, June 1969, Vol. SC-4 No. 3, pp 131–136. An amplifier 43 may be included in the output-to-input path ot the analog shift register to compensate for decay of approximating samples in storage.

In FIG. 4 block 44 includes elements 27 through 32 of FIG. 2 and these operate as previously described. Channel approximating signals y1 through yN are stored and circulated within analog shift register 45 clocked by word clock $w'$. As previously described, the current source generates incrementing current in accordance with incoming digital code words and the approximating signals are incremented by current injected on line 33 to one point in the analog shift register. The approximating signals appear sequentially on distribution highway 46. Transmission gates 35-1 through 35-N are operated sequentially by channel timing pulses T1' through TN' to distribute the approximating signals to interpolation filters FR-1 through FR-N and thence to corresponding analog signal sinks.

Analog shift register 45 may be identical to element 41 of FIG. 3. Amplifier 47 may be included in the output-to-input path. However, the gain of this amplifier should provide a loop gain of less than unity. Otherwise the circulating approximating signals will grow exponentially on each pass. A loop gain of less than unity provides an exponential decay of approximating signals and thereby simulates the integrator leak associated with each individual accumulator of FIG. 2. Alternatively, the integrator leak can be provided by a single resistor 48 shunt connected to any point on the analog shift register loop.

In FIG. 4 the transmission gates pass reconstructed analog samples to individual channel interpolation filters, whereas in FIG. 2 the transmission gates passed incrementing currents to individual channel accumulators. In FIG. 4 the interpolation filters are of the type used in conventional PCM systems.

In all of FIGS. 1, 2, 3 and 4, it is important that the channel timing pulses do not overlap in time. Otherwise, interchannel crosstalk may result. The terminal time bases should be designed to provide appropriate guard intervals between channel timing pulses. In addition, the current sources 17 and 29 should be provided with a guard pulse which disables them through the brief interval between channel timing pulses in FIGS. 1 and 2, or during the shifting instant of the analog shift registers of FIGS. 3 and 4.

Figure 5:
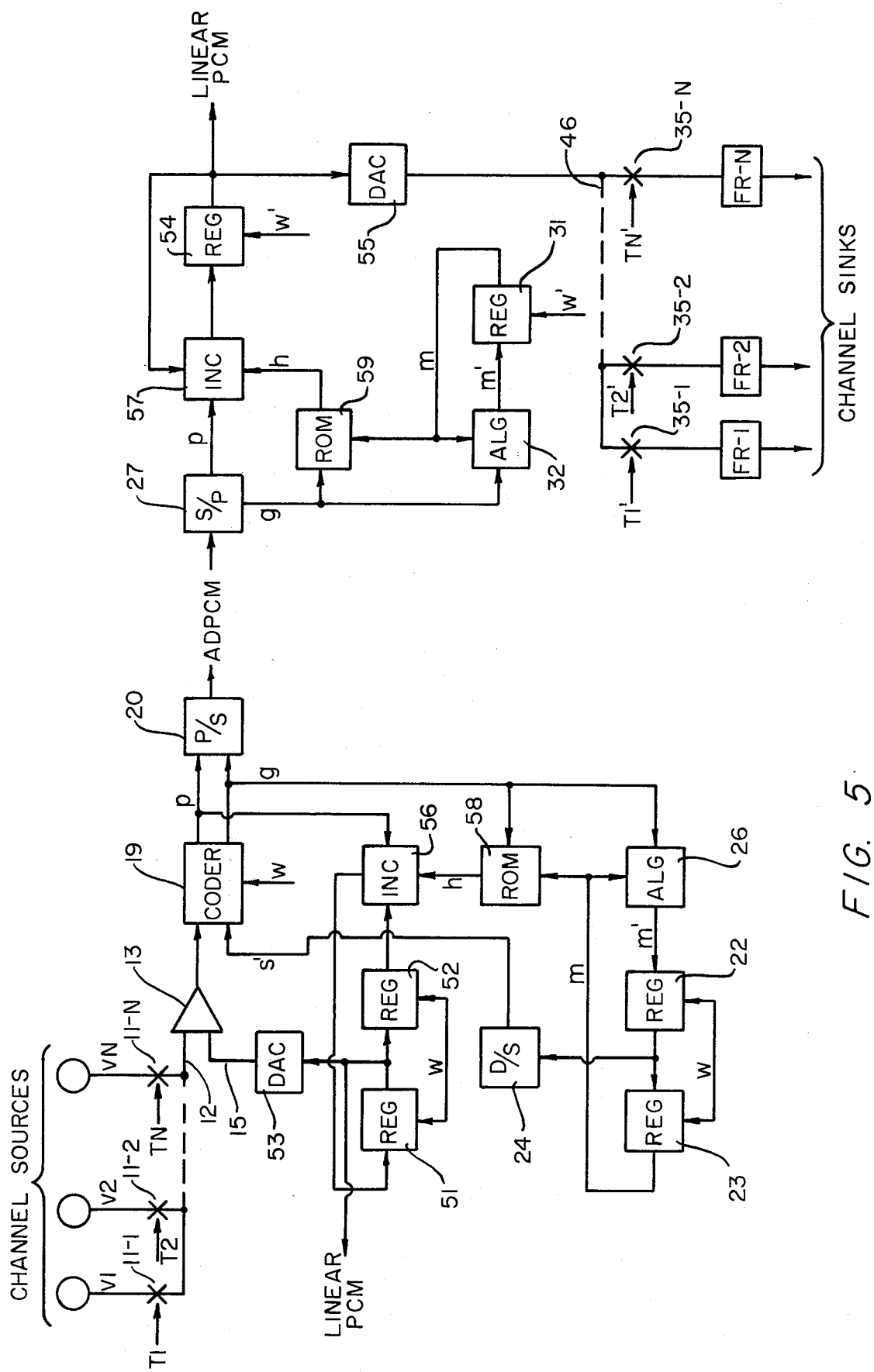
FIG. 5 shows a multi-channel adaptive differential pulse code modulation transmitting and receiving system employing digital shift registers.

FIG 5 shows another adaptive differential PCM system. Parts which correspond to FIGS. 1 and 2 bear like reference numbers. In this system the channel approximating signals y1 through yN are stored and circulated in digital form as binary coded words in parallel format in multibit digital shift registers 51, 52 and 54. In the transmitting terminal register 51 has N-1 stages and register 52 has one stage. Both registers are clocked by word clock $w$. In the receiving terminal register 54 has N stages. It is clocked by word clock $w'$.

The binary coded approximation signals are converted to analog form for the encoding operation by analog-to-digital converter 53 in the transmitting terminal. Thus, the combination of elements 51, 52 and 53 replaces analog shift register 41 of FIG. 3. The binary coded approximation signals are converted to analog form for distribution to corresponding channels by digital-to-analog converter 55 in the receiving terminal. Thus, the combination of elements 54 and 55 replaces the analog shift register 45 of FIG. 4.

The channel approximating signals are incremented in digital form by increment logic 56 in the transmitting terminal and identical increment logic 57 in the receiving terminal. One input to the increment logic is the binary coded channel approximation signal. Other inputs are the polarity bit p and the increment magnitude h in binary coded form. The output is the incremented channel approximation signal in binary coded form to be re-entered into the circulating storage register. The increment magnitude is $h = gr^m$ where $g$ is the magnitude code of the coded difference signal and m is the step size index from the step size logic. h is generated by element 58 in the transmitting terminal and identical element 59 in the receiving terminal. Elements 58 and 59 can each be realized as a read-only-memory (ROM) with binary coded inputs g and m and binary coded output h. Thus, elements 56 and 58 replace elements 17, 21 and 25 of FIG. 1 and elements 57 and 59 replace elements 29, 28 and 30 of FIG. 2. The other elements in FIG. 5 have been described previously in connection with FIGS. 1, 2, 3 and 4.

In FIG. 5 the amplitude range of the channel approximating signals is limited by the finite range of the binary code used to represent them. The increment logic 56 and 57 should be provided with "end-stops" such that the binary code words cannot be incremented positively beyond the upper limit of the code, or negatively beyond the lower limit of the code. Otherwise large errors would result, because a code word incremented positively beyond the upper code limit would become a new code word representing a lesser analog value, and vice versa. Thus, the end-stops of the incrementing logic act as amplitude limiters which clamp the signal peaks to the code limits, thereby holding the channel approximating signals within the normal working range of the system. For this reason, the FIG. 5 receiving terminal does not require the integrator leak function included in FIGS. 2 and 4.

In the receiving terminal of FIG. 5, register 54 contains the channel approximation signals in binary coded form. These are available in word-serial bit-parallel format at the output of register 54 or increment logic 57. The digital word rate is the same as the sampling rate for conventional PCM. Therefore, the FIG. 5 receiving terminal is also a multichannel ADPCM to linear-PCM converter. Digital-to-analog converter 55 and the analog demultiplexing system are not included in the converter. It is well known that linear-PCM can be converted to logarithmic-PCM by means of a digital compressor. Addition of a digital compressor to the ADPCM to linear-PCM converter provides a multi-channel ADPCM to logarithmic-PCM converter.

In the transmitting terminal of FIG. 5, registers 51 and 52 contain the channel approximating signals in binary coded form. These are available in word-serial bit-parallel format at the output of register 51, register 52, or increment logic 56. Therefore, the FIG. 5 transmitting terminal is also a form of multi-channel linear-PCM encoder. Addition of a digital compressor to the FIG. 5 transmitting terminal provides a multi-channel logarithmic-PCM encoder.

Figure 6:
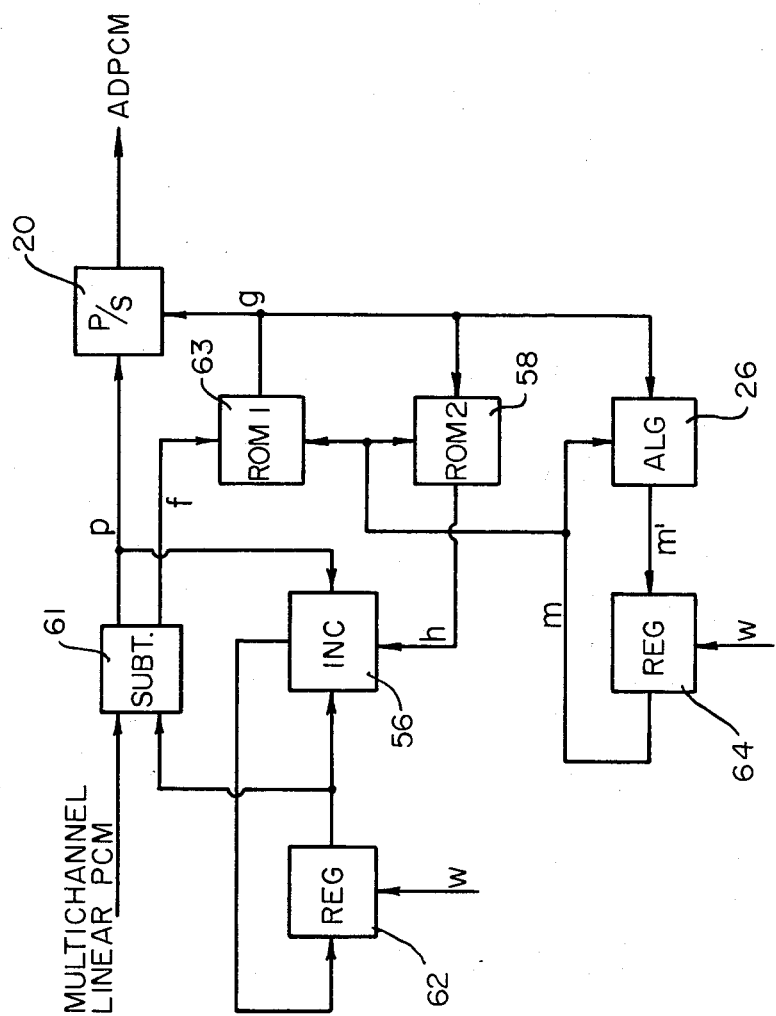
FIG. 6 shows a multi-channel system for converting linearly coded PCM signals to ADPCM signals.

A multi-channel linear-PCM to ADPCM converter can be obtained by appropriate modifications to the transmitting terminal of FIG. 5. These are shown in FIG. 6. The input is linear-PCM in word-serial bit-parallel format applied to digital subtraction logic 61. This is the digital equivalent to the time division multiplex of analog source samples $v$ in FIG. 5. The word rate of the input linear-PCM is synchronous with the terminal word clock $w$. Register 62 of FIG. 6 is an N-stage multi-bit shift register which stores and circulates the multi-channel binary coded approximation signals (channel $y$ signals) in word-serial bit-parallel format. Register 62 is clocked by word clock $w$. Its output is the second input to subtraction logic 61. The output of 61 is the difference signal ($v-y$) in digital form as a polarity bit $p$ and magnitude word $f$ all in parallel format. Because $v$ and $y$ are linearly coded, $f$ represents the difference magnitude in unit steps rather than adaptive steps. $f$ has as many bits as the linear code representing $v$ and $y$. The step size adaptation process is a scale compression which approximates $f$ unit steps by $g$ adapted steps such that $g$ can be expressed with only three bits (for 4-bit ADPCM), that is $$g \cong f/r^m$$

This division process is accomplished by read-only-memory ROM 63 with digital inputs $f$ and $m$ and digital output $g$. Thus, subtraction logic 61 substitutes for differential amplifier 13, and ROM 63 substitutes for the variable step size encoder. In FIG. 5 the coder output $g$ is registered at the end of each sampling interval, and incrementing occurs in the next interval concurrent with the sampling of the next channel. In FIG. 6 the read-only-memory output $g$ is established during the sampling interval so that incrementing can be concurrent with subtraction. Therefore, the two registers 51 and 52 of FIG. 5 are replaced by one N-stage register 62 in FIG. 6, and the two registers 22 and 23 of FIG. 5 are replaced by one N-stage register 64 in FIG. 6.

The remaining portions of FIG. 6 are identical to FIG. 5. The ROM 58 provides a scale expansion which converts $g$ adaptive steps to $h$ unit steps required because $y$ is linearly encoded in unit steps. Thus, $$h = gr^m \cong f$$

and the consequence of the two inverse scale conversions is the substitution of increment $h$ for the difference $f$. The scale conversions are continuously adjusted by parameter $m$ in accordance with the adaptation algorithm in logic 26. The read-only-memories 63 and 58 provide inverse functions and should be specified from that standpoint.

For the particular case of $r = 2$, the conversions from $f$ to $g$ and $g$ to $h$ are uniquely simple because the scaling factor $r^m$ is a power of 2. ROM 63 becomes logic which selects $g$ (according to $m$) as three contiguous bits of $f$. This logic must also force maximum $g$ if any higher weight bit of $f$ is 1; it should increase $g$ by 1 if the next lower weight bit of $f$ is 1. For $r = 2$, ROM 58 becomes logic which places (according to $m$) the three bits of $g$ in the appropriate contiguous positions of the unit step code.

The input to FIG. 6 is linearly coded PCM. It is well known that logarithmic-PCM can be converted to linear-PCM by means of a digital expandor. Addition of a digital expandor to FIG. 6 provides a multi-channel logarithmic-PCM to ADPCM converter.

In the foregoing descriptions the various digital signals have been shown in bit parallel format for convenience. However, they may also be generated and processed in bit-serial format if desired.

In the foregoing descriptions, the step size adaptation algorithm is $m' = m + g$-3 with algorithm logic having digital inputs $m$ and $g$ and digital output $m'$. The algorithm logic can be realized in any convenient form such as a read-only-memory. Obviously, one can use any adaptation algorithm in which the functional relationship $m' = f(m, g)$ can be expressed as a ROM input-output table and algorithms can be readily changed by replacing of ROM's.

It is also evident that the step size logic for the systems described can be readily modified to provide adaptation algorithms which depend on more than one previous encoding. For example, such an algorithm might be $m' = f(m, g, m_1, g_1)$ where $m$ and $g$ refer to the last encoding and $m_1$ and $g_1$ refer to the second last encoding for the same channel. The algorithm logic would provide output $m'$ from four inputs. Inputs $m$ and $g$ are provided as already described. Inputs $m_1$ and $g_1$ are provided by delaying each $m$ and $g$ for one frame in multibit shift registers of N stages clocked by the terminal word clock.

Thus, it is seen that the present invention provides a differential pulse code modulation system which time shares the encoding and decoding logic. The system provides economies not obtainable in prior art DPCM and ADPCM systems.

I claim:

1. An $n$ channel differential pulse code modulation system for converting input frames of time division multiplexed signal samples to corresponding output frames of digital words, each input frame containing one signal sample for each of n channels, wherein $n$ is any positive integer other than one, said system comprising means for storing frames of approximating signals, each approximating signal being a quantized approximation to a corresponding signal sample of the preceding input frame, means connected to receive said input frames of time division multiplexed signal samples and said frames of approximating signals and form frames of difference signals, one difference signal for each channel, a single pulse code modulation encoding means connected to receive said frames of difference signals, means for generating and applying to said pulse code modulation encoding means frames of step size control signals, the step size control signal for each channel being determined by its step size control signal in the preceding frame and the number of steps encoded for that channel in the preceding frame, said pulse code modulation encoding means serving to generate output frames of digital words responsive to said frames of step size control signals and said frames of difference signals, each digital word representing the polarity and adapted number of steps of the quantized difference between the signal sample for the (j)th channel of the present frame and the signal approximating the signal of the (j)th channel in the preceding frame, and means responsive to said frames of step size control signals and said frames of digital words for incrementing said means for storing frames of approximating signals, said incrementing means serving to increment the approximating signal of a preceding channel during the time allotted to generating the digital word for the (j)th channel of the present frame.

2. An n channel differential pulse code modulation system as in claim 1 in which the input frames of time division multiplexed signal samples are digital words, each digital word being a linear pulse code modulation encoding of a corresponding channel, whereby said system converts n channel pulse code modulation input to n channel differential pulse code modulation output.

3. An n channel differential pulse code modulation system as in claim 1 in which said input frames of time division multiplexed signal samples are obtained from a plurality of input analog signals by a multiplexer which sequentially samples the input signals to form recurring frames of time division multiplexed signal samples.

4. An n channel differential pulse code modulation system as in claim 1 in which said digital words are in parallel format and means for receiving said digital words for converting them to serial format for transmission.

5. An n channel differential pulse code modulation system as in claim 1 in which said storage means includes n capacitors one for each channel, and said incrementing means includes a current source having an output current determined by said frames of step size control signals and said frames of digital words, and means for sequentially connecting the current source to the (j)th capacitor to increment the approximating signals for the (j)th channel once each frame.

6. An n channel differential pulse code modulation system as in claim 1 in which: said storage means is a recirculating analog shift register with one cell for each channel serving to store and recirculate the quantized approximating signals; means forming recurring frames of quantized approximating signals including means for continuously clocking the shift register so that the approximating signals appear sequentially at the shift register output; and said incrementing means being connected to one cell of said shift register to increment the approximating signal for each channel as it passes through said cell once each frame.

7. An n channel differential pulse code modulation system as in claim 1 in which: said accumulating means is a recirculating digital shift register having one multicell for storing a digital code word representing the quantized approximating signal for each channel, said means forming recurring frames of digital approximating signals including means for continuously clocking the digital shift register so that the digital approximating signals for each channel appear sequentially at the register output and a digital-to-analog converter for converting the digital approximating signals to analog form for application to the means forming frames of difference signals, said incrementing means including a digital algebraic adder between the register output and the register input whereby each digitally coded approximation signal is digitally incremented and re-entered into the register.

8. An n channel differential pulse code modulation system as in claim 7 in which the digital approximating signals are incremented with step size control signals controlled in accordance with an adaptation algorithm which is responsive to one or more preceding encoded digital words of the corresponding channel.

9. An n channel differential pulse code modulation system as in claim 7 in which said incrementing means include means which permit the digital approximating signals to be incremented to the finite limits, but not beyond the finite limits of the digital code which represents them.

10. An n channel differential pulse code modulation system as in claim 2 in which the magnitude of the increment applied to the approximating signal for each channel is controlled by an adaptation algorithm responsive to one or more preceding encoded digital words for the corresponding channel.

11. An n channel differential pulse code modulation system as in claim 7 including means for providing an output at said register output, the signal appearing at said output being a linear pulse code modulation encoding of the signal for each of said channels.

12. An n channel differential pulse code modulation system including means for converting input frames of time division multiplexed signal samples to corresponding output frames of digital words, each input frame containing one signal sample for each of said n channels, and means for reconverting said frames of digital words to frames of time division multiplexed signal samples with one signal sample for each of said n channels, wherein n is any positive integer other than one, said converting system comprising means for storing frames of approximating signals each approximating signal being a quantized approximation to a corresponding signal sample of the preceding input frame, means connected to receive said input frames of time division multiplexed signal samples and said frames of approximating signals and form frames of difference signals, one difference signal for each channel, a single pulse code modulation encoding means connected to receive said frames of difference signals, means for generating and applying to said pulse code modulation encoding means frames of step size control signals, the step size control signal for each channel being determined by its step size control signal in the preceding frame and the number of steps encoded for that channel in the preceding frame, said pulse code modulation encoding means serving to generate output frames of digital words responsive to said frames of step size control signals and said frames of difference signals, each digital word representing the polarity and adapted number of steps of the quantized difference between the signal sample of the (j)th channel of the present frame and the signal approximating the signal of the (j)th channel in the preceding frame, means responsive to said frames of step size control signals and said frames of digital words for incrementing said means for storing frames of approximating signals, said incrementing means serving to increment the approximating signal of a preceding channel during the time allotted to generating the digital word for the (j)th channel of the present frame, and said means for reconverting said frames of digital words including a single pulse code modulation decoder for receiving said frames of digital words and generating frames of increment signals, one for each channel, means for storing frames of approximating signals, each approximating signal being a quantized approximation to a corresponding signal sample of the preceding input frame and means for applying the increment signals to said means for storing frames of approximating signals to increment the approximating signals in the present frame.

13. An n channel differential pulse code modulation system as in claim 12 in which said input frames of time division multiplexed signal samples are obtained from a plurality of analog signals by a multiplexer which sequentially samples the input signals and in which said frames of approximating signals stored in said reconverting means are distributed to corresponding output channels by means of a demultiplexer.

* * * * *